United States Patent Office 3,222,306
Patented Dec. 7, 1965

3,222,306
WATER-RESISTANT POLYVINYL ALCOHOL ADHESIVES
Hideo Suzumura and Hisao Miyahara, Kurashiki, Japan, assignors to Kurashiki Rayon Co., Ltd., Kurashiki-shi, Japan, a corporation of Japan
No Drawing. Filed Mar. 19, 1962, Ser. No. 181,499
6 Claims. (Cl. 260—17.4)

The present invention relates to water-resistant adhesives containing polyvinyl alcohol which are particularly adapted for use as adhesives in the manufacture of paper products, such as corrugated cardboard, and which impart to the bonded portions of the products produced a strong adhesive power and water-resistance.

At the present time, starch solutions, water glass solutions, and dextrin solutions are primarily used as adhesives in the manufacture of corrugated cardboard and the like. However, these adhesives must be heated to relatively high temperatures in the course of their use and the danger exists that the product may, as a result be adversely affected.

Thus, in the manufacture of corrugated cardboard according to Japanese Patent 130,266, an alkaline starch solution is used as the adhesive, and the corrugating machine is heated in the necessary areas with high pressure steam of more than 8 kg./cm.$^2$ pressure and there is continuously effected a high-temperature bonding of the liner and core paper. The corrugated roll must of necessity be kept at a certain temperature in order to permit proper corrugation of the core paper, but it has been a long-standing desire of corrugated cardboard manufacturers to have the temperature of bonding as low as possible.

On the other hand, the bonding of one-face corrugated cardboard with a liner by means of a water-glass solution by means of a lining machine, which is practiced extensively in smaller factories, is subject to the serious disadvantage that the product is susceptible of becoming discolored or stained.

With the recent expansion of the fields of application of corrugated cardboard, the demand for water-resistance in the bonded portions of the product is becoming more and more prevalent. However, corrugated cardboard manufactured by the use of adhesives which are based on starch solutions, or water-glass solutions, or dextrin solutions, and the like, has poor water-resistance in its bonded areas and its bonded portions tend to become exfoliated in a short time if the product comes into contact with water. The problem of providing water-proof bonding is, therefore, present.

It is, accordingly, an object of the present invention to provide an improved adhesive for use in the manufacture of corrugated cardboard, and the like.

It is a further object of the invention to provide an adhesive of the character indicated which provides a water-resistant bond.

In accordance with the invention, an adhesive is provided which comprises an aqueous solution of polyvinyl alcohol which contains a sugar, viz. a saccharide, more particularly an oligosaccharide, viz. a monosaccharide, a disaccharide, a trisaccharide or a tetrasaccharide. In a preferred form of the invention, the adhesive also includes an alkali metal silicate and/or a highly siliceous pigment, preferably both.

In our co-pending application Serial No. 119,058, filed June 23, 1961, we describe an adhesive comprising an aqueous solution of polyvinyl alcohol containing a highly-siliceous pigment and an alkali metal silicate. A preferred form of the present invention, therefore, may be considered as comprising the adhesive of our co-pending application to which a saccharide has been added in accordance with the present invention.

It is a feature of this invention that the adhesive can be used in the manufacture of paper products, such as corrugated cardboard, can be applied at low temperature, and is readily used in modern high-speed corrugated cardboard machines.

It is a further feature of the invention that the adhesive gives a very strong adhesive bond which also has high water-resistance.

Other objects and features of the invention will be readily apparent from the following detailed description which includes reference to specific embodiments of the invention.

The saccharides which are effectively employed in accordance with this invention are preferably those which are readily hydrolyized to give the reactivity of aldehydes or ketones, or those readily resinified by heating, e.g. oligosaccharides such as maltose, lactose, and saccharose.

In Table 1 which follows there are tabulated the results of a series of comparative experiments which demonstrate the differences between adhesives of this invention comprising solutions of polyvinyl alcohol and saccharides, and prior art adhesives. In Table 1 the adhesive power is that for paper used in corrugated cardboard manufacture and bonded by the adhesives being tested.

The viscosity of each adhesive tested was adjusted to 300 centipoises (at 25° C.). The papers used were good quality liner and yellow cardboard core papers. To measure adhesion, the papers were preheated to the temperatures specified, and the adhesives were applied at the rate of 200 g./m.$^2$; after the sheets had been laminated by compression in conventional manner, the power required to peel them apart was measured. Water resistance was measured as the time elapsed before the laminated sheets peeled apart after soaking in water at 20° C., while the water was stirred lightly.

TABLE 1

| Composition of adhesive (Parts by weight) | | Adhesive power expressed as peeling off time, (g./cm.) | | Water resistance |
|---|---|---|---|---|
| Polyvinyl Alcohol | Saccharose | At 150° C. after 3 seconds | At 180° C. after 3 seconds | |
| 100 | ---------- | 125 | 265 | 10 min. |
| 100 | 25 | 184 | 450 | More than 48 hrs. |
| 100 | 50 | 267 | 475 | Do. |
| 100 | 75 | 334 | 484 | Do. |
| 100 | 100 | 325 | 492 | Do. |
| ------ | (1) | 260 | 280 | 3 min. |
| (2) | ---------- | 214 | 350 | 7 min. |

[1] Liquid sodium silicate and starch adhesives.
[2] Adhesive of Japanese Patent 130,266.

A second series of comparative tests were made to show the comparative action of adhesives comprising polyvinyl alcohol solutions containing a saccharide, represented by saccharose, and/or a silicate, represented by sodium silicate, and/or a highly siliceous pigment, represented by clay. The results are shown in Table 2 below. In Table 2 all test conditions and methods are the same as those employed in Table 1.

TABLE 2

| Composition of adhesive (Parts by weight) | | | | Adhesive power expressed as peeling apart time (g./cm.) | | Water resistance |
|---|---|---|---|---|---|---|
| Polyvinyl Alcohol | Clay | Sodium silicate | Saccharose | At 150° C. after 3 seconds | At 180° C. after 3 seconds | |
| 100 | ---- | ------ | ---------- | 125 | 265 | 10 min. |
| 100 | 200 | ------ | ---------- | 140 | 200 | 8 min. |
| 100 | ---- | 15 | ---------- | 160 | 240 | 12 min. |
| 100 | 200 | 15 | ---------- | 280 | 290 | More than 48 hrs. |
| 100 | ---- | ------ | 50 | 267 | 475 | Do. |
| 100 | 200 | ------ | 50 | 434 | 517 | Do. |
| 100 | ---- | 15 | 50 | 340 | 490 | Do. |
| 100 | 200 | 15 | 50 | 500 | 517 | Do. |

The new adhesives described above are suitably prepared in the following way:

Commercial polyvinyl alcohol is dissolved in water. The amount of polyvinyl alcohol employed, and thus the concentration of the resulting solution, will generally vary, depending upon the degree of polymerization of the polyvinyl alcohol, but concentrations of 10 to 15% by weight are preferred. To this solution, the oligosaccharide is added, mixed and dissolved. The viscosity of the solution can then be adjusted by adding water to the extent desired. The amount of oligosaccharide, e.g., saccharose (sucrose), added can vary and can advantageously be up to 100% based on the weight of the polyvinyl alcohol, or more, but it preferably is at least 25% by weight. When the oligosaccharide is to be used in combination with a highly siliceous pigment and/or an alkali metal silicate, these components are preferably added before the oligosaccharide is added, although the order may be reversed. Thus, to the initial polyvinyl alcohol solution there is added a highly siliceous pigment, which is suitably kaolinite ,$Al_2O_3.2SiO_2.2H_2O$) and silica ($SiO_2$), or a clay such as kaolin. To this mixture, there can be added an alkali metal silicate, e.g. sodium silicate, potassium silicate, and lithium silicate. When kaolinite and silica are used as the pigment, the alkali metal silicate may be formed in situ by adding an alkali metal hydroxide, e.g. sodium hydroxide. The three components are thoroughly and uniformly mixed together until a smooth composition is produced.

The chemical reactions involved in the above operation, particularly in the case of in situ formation of alkali metal silicate are believed to be as follows:

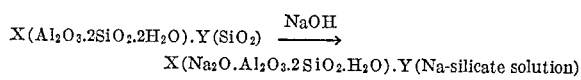

$$X(Al_2O_3.2SiO_2.2H_2O).Y(SiO_2) \xrightarrow{NaOH} X(Na_2O.Al_2O_3.2SiO_2.H_2O).Y(\text{Na-silicate solution})$$

The alkali metal silicate gels which are thus obtained are believed to become stabilized by reason of the presence of hydroxyl ions or groups, i.e., peptization. The hydroxyl radicals of the polyvinyl alcohol are helpful in causing this peptization of the alkali metal silicate gels, thereby reducing the hydrophilic nature of the polyvinyl alcohol resulting from the presence of the hydroxyl radicals. In the case of adding preformed alkali metal silicates to clay, it is assumed that there is a formation of alkali silicates of a higher silicate mol ratio. The oligosaccharide is then added. Alternatively, a polyvinyl alcohol-oligosaccharide solution and a polyvinyl alcohol-pigment and/or silicate solution can be separately formed and the two solutions then combined.

The precise reasons for the chemical change at the time of adhesion by heating these solutions are not entirely clear, but it has been demonstrated that highly effective adhesion is achieved.

The invention will be further understood from the following specific examples of practical application. However, it will be understood that these examples are not to be construed as limiting the scope of the present invention in any manner. In these examples, all parts are by weight, unless otherwise indicated.

*Example 1*

Five kg. of polyvinyl alcohol having a degree of saponification of 98.5 mol percent and a degree of polymerization of 1200 were dissolved in water, and then 2.5 kg. of commercial refined sugar (saccharose) were dissolved in the resulting solution to produce about 80 kg. of an adhesive of 9.5% solids concentration. Using this adhesive, adhesion by heating of laminated paper was continuously effected on a corrugating machine and there was produced a corrugated cardboard united by an adhesive exhibiting excellent characteristics, as shown in Table 1, with respect to adhesive power and water resistance.

*Example 2*

Five kg. of polyvinyl alcohol having a degree of saponification of 98.17 mol percent and a degree of polymerization of 1700 were dissolved in water to prepare 50 kg. of a solution of 10% solids concentration. Separately, to 10 kg. of Japanese clay, were added 20 g. of sodium hexametaphosphate. The mixture was dispersed in water, and was then mixed with the polyvinyl alcohol solution. Into this preparation, were then added 2.5 kg. of crude sugar (saccharose), which was dissolved by mixing.

The resulting solution was diluted to a viscosity suitable for the size roll of a corrugating machine, which produced about 100 kg. of the adhesive solution. Using this adhesive solution, in the manner described in Example 1, a corrugated cardboard possessing excellent performance characteristics, as shown in Table 2, was manufactured.

*Example 3*

Five kg. of polyvinyl alcohol having a degree of saponification of 98.5 mol percent and a degree of a polymerization of 1700 were dissolved in water. Separately, 10 kg. of a clay of a kaolinite silica composition produced in Japan and 1.5 kg. of No. 3 water glass were mixed and dispersed in 20 kg. of water. This mixture was added to the polyvinyl alcohol solution. To the resulting mixture were added 2.5 kg. of commercial refined sugar, which was dissolved, and water was added to dilute the preparation to the viscosity suitable for the operation of a corrugating machine. This preparation was used in the manufacture of a corrugated cardboard, and a corrugated cardboard of excellent properties as shown in Table 2 was obtained.

*Example 4*

The process of Example 1 was repeated but glucose was employed in place of the commercial refined sugar used in Example 1. The resulting adhesive exhibited a very high adhesive power, and had good water resistance in the corrugated cardboard produced with it.

*Example 5*

The process of Example 2 was repeated, employing L-arabinose in place of the crude sugar used in Example 2. The resulting adhesive when used to unite paper to form corrugated cardboard had a very high adhesive power and water resistance.

The materials and the relative relationships set forth in the examples are those preferred in carrying out this invention, but it will be understood that other materials and relationships may be used within the scope of the invention. In general, unless otherwise indicated, conventional operations and techniques and convetional substances are suitably employed in forming the adhesives of this invention.

Thus, the polyvinyl alcohol suitable for use in accordance with the present invention is advantageously commercial polyvinyl alcohol and includes polymers composed principally of the vinyl alcohol radical, but is not limited to pure polyvinyl alcohol. Polyvinyl alcohol is a polymer containing hydroxyl groups and corresponding to the formula:

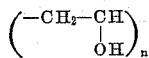

wherein $n$ is an integer which can vary within wide limits, as is well-known in the art. Polyvinyl alcohol can be produced from the corresponding polyvinyl ester, e.g., polyvinyl acetate, by alkaline or acid saponification or reesterification, i.e. alcoholysis, in accordance with the following equation:

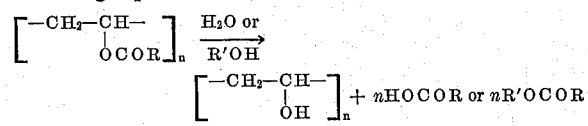

Typical polyvinyl alcohols which can be suitably used are described, for example, in Cline et al. U.S. Patent 2,636,803.

The polyvinyl alcohol may be of the fully or partially-saponified type.

The partially-saponified polyvinyl alcohol usable in accordance with this invention is produced by conventional techniques from polyvinyl esters, such as polyvinyl acetate, by known saponification procedures as described, for example, in Scott et al. U.S. Patent No. 2,266,996 and Bryant et al. U.S. Patent No. 2,668,809. As is known in the art, a "partially saponified" polyvinyl alcohol is the product of the hydrolysis of a polyvinyl ester, e.g., polyvinyl acetate, in which less than all of the ester groups, e.g., aectate groups, have been converted to hydroxyl groups. As explained in Scott et al. 2,266,996, the saponification or hydrolysis reaction is stopped by neutralizing the catalyst when the desired percentage conversion has occurred. The partially-saponified polyvinyl alcohols which are suitably used in accordance with this invention are sufficiently saponified to be water-soluble which, according to Bryant et al. 2,668,809, requires the conversion of at least about 75% of the ester groups into hyroxyl groups. Preferably the polyvinyl alcohol has a degree of saponification of at least 95 mol percent. The degree of polymerization of the polyvinyl alcohol, upon which viscosity is dependent, may vary widely but is suitably at least about 1000.

Similarly, the sugar, i.e., the oligosaccharide, is advantageously of any convenient commercial form, and the pigment is of commercial grade and is suitably any highly siliceous material such as the clays referred to above. In like manner, commercial alkali metal silicates are used, the quantities used being based on dry weight.

It will also be understood that various changes and modifications in addition to those indicated above may be made in the embodiments herein described without departing from the scope of the invention as defined in the appended claims. It is intended, therefore, that all matter contained in the foregoing description shall be interpreted as illustrative only and not as limitative of the invention.

We claim:
1. A water-resistant adhesive comprising,
an intimate admixture in water of polyvinyl alcohol, a sugar, a highly siliceous clay, and an alkali metal silicate,
said sugar being present in an amount that is from about 25 percent to 100 percent by weight of said polyvinyl alcohol, said clay being present in an amount by weight which is about twice the amount by weight of said polyvinyl alcohol, and said alkali metal silicate being present in an amount by weight which is about one-fifth the amount by weight of polyvinyl alcohol.

2. A water-resistant adhesive comprising an intimate admixture in water of about 100 parts by weight of polyvinyl alcohol, about 50 parts by weight of a sugar, about 200 parts by weight of a highly siliceous clay, and about 15 parts by weight of an alkali metal silicate.

3. A water-resistant adhesive according to claim 2, wherein said alkali metal silicate is sodium silicate.

4. In the manufacture of corrugated cardboard the improvement which comprises adhesively securing the components of the cardboard to each other by means of a water-resistant adhesive comprising an intimate admixture in water of polyvinyl alcohol, a sugar, a highly siliceous clay and an alkali metal silicate,
said sugar being present in said admixture in an amount that is from 25 percent to 100 percent by weight of said polyvinyl alcohol, said clay being present in an amount by weight which is about twice the amount by weight of said polyvinyl alcohol, and said alkali metal silicate being present in an amount by weight which is about one-fifth the amount by weight of said polyvinyl alcohol.

5. In the manufacture of corrugated cardboard, the improvement which comprises adhesively securing the components of the cardboard to each other by means of a water-resistant adhesive comprising an intimate admixture in water of about 100 parts by weight of polyvinyl alcohol, about 50 parts by weight of a sugar, about 200 parts by weight of a highly siliceous clay, and about 15 parts by weight of an alkali metal silicate.

6. An improvement in the manufacture of corrugated cardboard according to claim 5, wherein said alkali metal silicate of said water-resistant adhesive is sodium silicate.

References Cited by the Examiner
UNITED STATES PATENTS

| | | | |
|---|---|---|---|
| 2,135,075 | 11/1938 | Herrmann | 260—17.4 |
| 2,250,681 | 7/1941 | Schwartz | 260—17.4 |
| 2,487,448 | 11/1949 | Kingerley | 260—17.4 |
| 2,833,661 | 5/1958 | Fler | 106—84 |

JOSEPH L. SCHOFER, *Primary Examiner.*

LEON J. BERCOVITZ, *Examiner.*